United States Patent [19]

Fallent

[11] Patent Number: 5,217,731
[45] Date of Patent: Jun. 8, 1993

[54] INJECTION MOLDING TOOL WITH RETRACTABLE BEAD-FORMING SEGMENTS

[75] Inventor: Gerhard Fallent, Laussa, Austria

[73] Assignee: Rudolf Zahradnik, Mistelbach, Austria

[21] Appl. No.: 785,337

[22] Filed: Oct. 30, 1991

[51] Int. Cl.⁵ .......................................... B29C 45/44
[52] U.S. Cl. .................................... 425/556; 249/63; 249/178; 249/180; 249/185; 264/318; 425/442; 425/577; 425/DIG. 58
[58] Field of Search ............... 249/63, 178, 180, 184, 249/185; 425/554, 556, 442, 809, DIG. 58, 577; 264/318

[56] References Cited

U.S. PATENT DOCUMENTS

| | | | |
|---|---|---|---|
| 4,456,214 | 6/1984 | Ruck et al. | 425/DIG. 58 |
| 4,708,632 | 11/1987 | Mitteregger et al. | 249/180 |
| 4,848,718 | 7/1989 | Harrison | 425/577 |

FOREIGN PATENT DOCUMENTS

| | | |
|---|---|---|
| 1255293 | 11/1967 | Fed. Rep. of Germany . |
| 3444879A1 | 7/1985 | Fed. Rep. of Germany . |
| 1344185 | 10/1963 | France . |
| 7809421 | 3/1980 | Netherlands . |

Primary Examiner—Tim Heitbrink
Attorney, Agent, or Firm—Herbert Dubno

[57] ABSTRACT

An injection-molding tool for producing pipe fittings with an internal groove has bead-forming segments of the core alternating with one another on respective bell crank levers at alternating bell-crank levers being fulcrummed at fixed locations on a core sleeve while the other bell-crank levers are fulcrummed on a ring movable axially on the core sleeve. The actuator is a hydraulically or pneumatically moved actuating sleeve having grooves or slits receiving radial arms of the levers with abutments or end surfaces axially staggered so that one group of segments is retracted inwardly and axially first to allow the second group of segments to be swung inwardly.

7 Claims, 4 Drawing Sheets

INJECTION MOLDING TOOL WITH RETRACTABLE BEAD-FORMING SEGMENTS

FIELD OF THE INVENTION

The present invention relates to an injection molding tool having a separable outer die member and a die core which is provided with bead-forming segments projecting from a periphery of the core to define in the injection molded product an inwardly open groove and retractable to permit release of the injection molded article.

BACKGROUND OF THE INVENTION

Pipe fittings of thermoplastic synthetic resins can be produced by injection molding processes in dies or molding tools having separable outer die members and a die core. At least at one end of the injection molded fitting it is advantageous to provide an inwardly open groove for insertion of a sealing material or ring in the assembly of the fitting into a piping system. This inwardly open groove is formed by an annular bead on the core which, for removal of the injection molded article, may be divided into segments which can be retracted into the interior of the die core.

In earlier systems for this purpose, a complex mechanism was required in the core and this mechanism had to be fabricated at high cost, took up considerable space and, therefore, could only be used for large core diameters or large internal diameter pipe fittings.

OBJECTS OF THE INVENTION

It is the principal object of the present invention to provide a mechanism for actuating the retractable bead segments of an injection molding tool which is of relatively simple construction, especially space saving and suitable for the production of injection molded pipe fittings of small diameter and which, because of the small number of parts, has greater reliability and a longer useful life than earlier systems.

Another object of the invention is to provide an injection molding tool for producing an injection molded pipe fitting with an internal groove which avoids drawbacks of earlier devices.

SUMMARY OF THE INVENTION

These objects and others which will be apparent hereinafter are attained, in accordance with the invention in that the bead segments are formed on the free ends of generally axially directed lever arms of bell-crank or double-arm levers and the pivots or fulcrums of the bell-crank levers of a first segment group having outwardly converging flanks are provided on a ring which is axially shiftable in a core sleeve. The pivot axes or fulcrums of a second segment group, lying between the first segments and generally having inwardly converging flanks, can be nonshiftable on the core sleeve. An actuating sleeve in the interior of the core sleeve is slidable upon a cylindrical shaft formed as a core carrier formed by a pneumatic or hydraulic cylinder forming a fluid operated means for axially shifting the actuating sleeve.

In the actuating sleeve axially extending inwardly opening slots are provided in the form of axially extending grooves or slits, into which the radially directed lever arms of the bell-crank levers project for engagement by controlling end faces or abutments. These abutments, when the actuating sleeve is retracted, cause the levers to pivot and the elongated lever arms to swing inwardly and draw the levers of the first group axially, thereby retracting the bead segments from the groove formed in the injection molded part.

According to the invention, the abutments for actuating the levers of the first group of segments are axially spaced from the abutments for actuating the second group of segments, the axial spacing providing for the axial displacement of the ring and the levers of the first group out of the path of the inward swing of the levers and segments of the second group.

More particularly, an injection molding tool for producing an injection molded pipe fitting with an internal groove comprises:

a die core;

a plurality of bead segments movable inwardly and outwardly on the core, forming an annular bead in an outer position of the segments defining the groove, and retractable inwardly to release the pipe fitting from the core, alternate ones of the segments forming a first group of segments having outwardly converging flanks;

respective double-arm levers for actuating the bead segments, the levers each having an axially extending elongated lever arm carrying the respective segment on an end thereof, a generally radial arm and a fulcrum between the arms;

a cylindrical shaft formed as a core carrier, the segments and the levers being arrayed around the shaft;

a core sleeve surrounding the shaft;

a ring received in the core sleeve and axially shiftable therein, the fulcrums of the levers of the first group of segments formed being mounted on the ring for axial displacement therewith, the fulcrums of the levers of a second group of the bead segments between the bead segments of the first group being fixed on the sleeve;

an actuating sleeve axially shiftable on the shaft and within the core sleeve, the actuating sleeve being formed with axially extending outwardly open slots receiving the radial arms of the levers and having abutments at ends of the slots engageable with the radial arms for actuating the levers, the abutments including a first group of abutments engageable with the radial arms of the levers of the first group of segments effective to retract the first group of segments inwardly and move the first group of segments and the ring axially and a second group of abutments engageable with the radial arms of the levers of the second group of segments for retracting same inwardly upon axial displacement of the actuating sleeve, the first group of abutments being axially spaced from the second group of abutments on the actuating sleeve; and fluid-operated means connected with the actuating sleeve for axially shifting same.

An advantage of the invention is that a host of other movable parts such as pins, sliding sleeves guided on the actuating sleeve and the like, common in earlier mechanisms for retracting bead segments, can be avoided and the entire construction greatly simplified. The invention, therefore, uses a reduced number of parts in the interior of the core with the advantages of greater reliability, reduced core dimensions and more precise positioning of the segments forming the annular bead.

Advantageously, the actuating sleeve is formed at its end turned toward the bead which, when the segments are swung outwardly, fully bridges between the bead-forming segments and the core carrier, i.e. completely fills the swinging space for the segments so that this portion of the actuating sleeve can rest against the backs of the segments and along the surface of the cylindrical shaft tightly to provide direct force transmission therebetween. The segments are thereby blocked in their bead-forming positions so that the flanks of the segments seal against one another and discontinuities around the bead are avoided and further so that the segments are not displaced during the injection process.

The actuating sleeve can thus provide a wedging action for this purpose and the converging flanks of the first group of segments can provide a wedging action pressing the segments against one another to be fully determinative, statically, of the positions of the bead segments and thereby precisely position the latter for the injection molding operation.

According to a feature of the invention, surfaces of the bell-crank levers turned toward the core sleeve have inclined surfaces or abutment surfaces which engage inclined inner surfaces of the core sleeve or some other part structurally connected thereto. These inclined surfaces support the wedging action described and permit the segments to withstand high molding forces and which accurately position them.

It has also been found to be advantageous for the bell-crank levers of the first segments to be formed with sliding surfaces turned toward the core sleeve and which, during axial shifting from the working position of the retracted segments, can ride on an inner guide or camming surface of the core sleeve or a body connected thereto.

After retraction of the first group of segments, these are axially displaced out of the path of the second group of segments, the bell-crank levers being retained by the sliding surfaces in their retracted positions.

For shifting the bead segments outwardly, the axially extending lever arms of the bell-crank levers of the first segment group each can be formed with an abutment surface turned away from the core sleeve and engaged by the end surface of the actuating sleeve for shifting into the working position.

The actuating sleeve with its end face can thus engage a hook like step in the bell-crank lever of each bead segment of the first group so that these bead segments are first shifted axially and then swing outwardly.

From the viewpoint of overall functioning it is important that the actuating sleeve be axially shiftable within the core sleeve relative to the latter by means of a pneumatic or hydraulic actuator and that the actuating sleeve have at the side thereof turned toward the cylinder, an engagement face which can come to rest on an inner annular surface of the core sleeve. The core sleeve, after opening of the separable outer die and unlocking of the ring fitting into the separating plane between the outer die and the core sleeve can be withdrawn to enable removal of the injection molded part.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
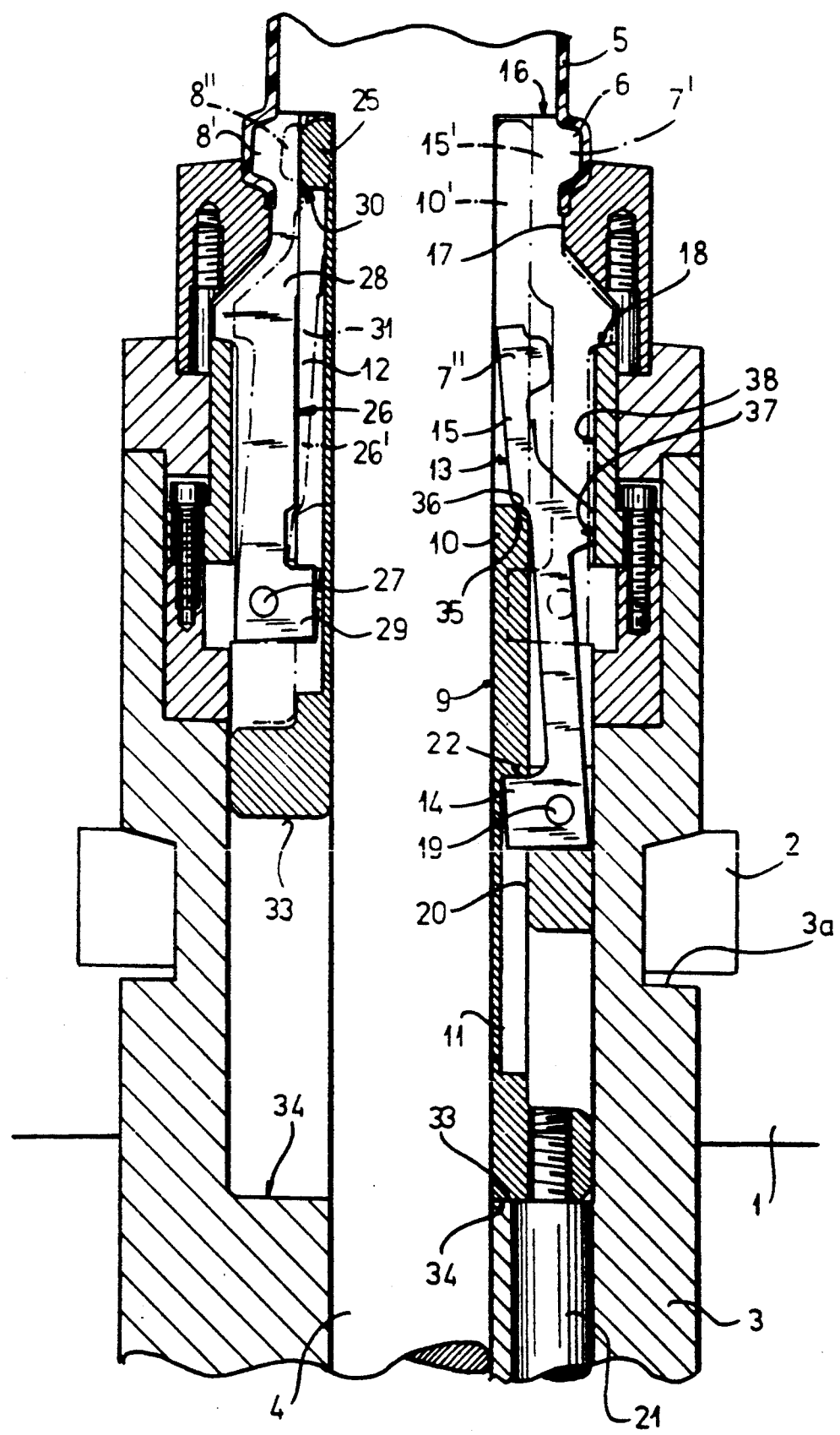
FIG. 1 is a diagrammatic axial section through an injection molding tool according to the invention showing the levers and segments of two different groups and comparing the first different positions of the actuating sleeve.
Figure 3:
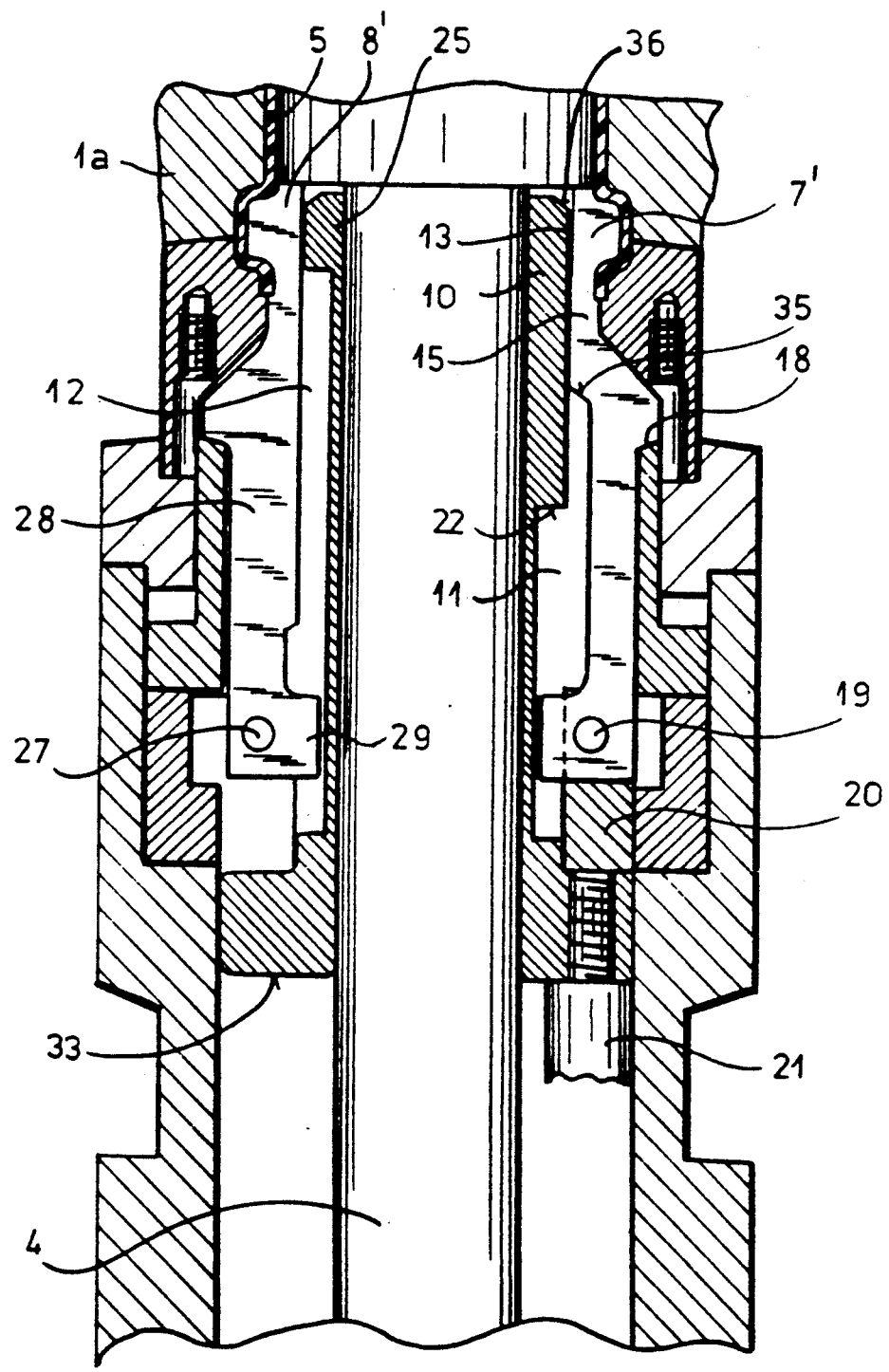
FIG. 3 is a view generally similar to FIG. 1 but showing the bead forming segments in their working position and the actuating sleeve for these segments advanced.
Figure 4:
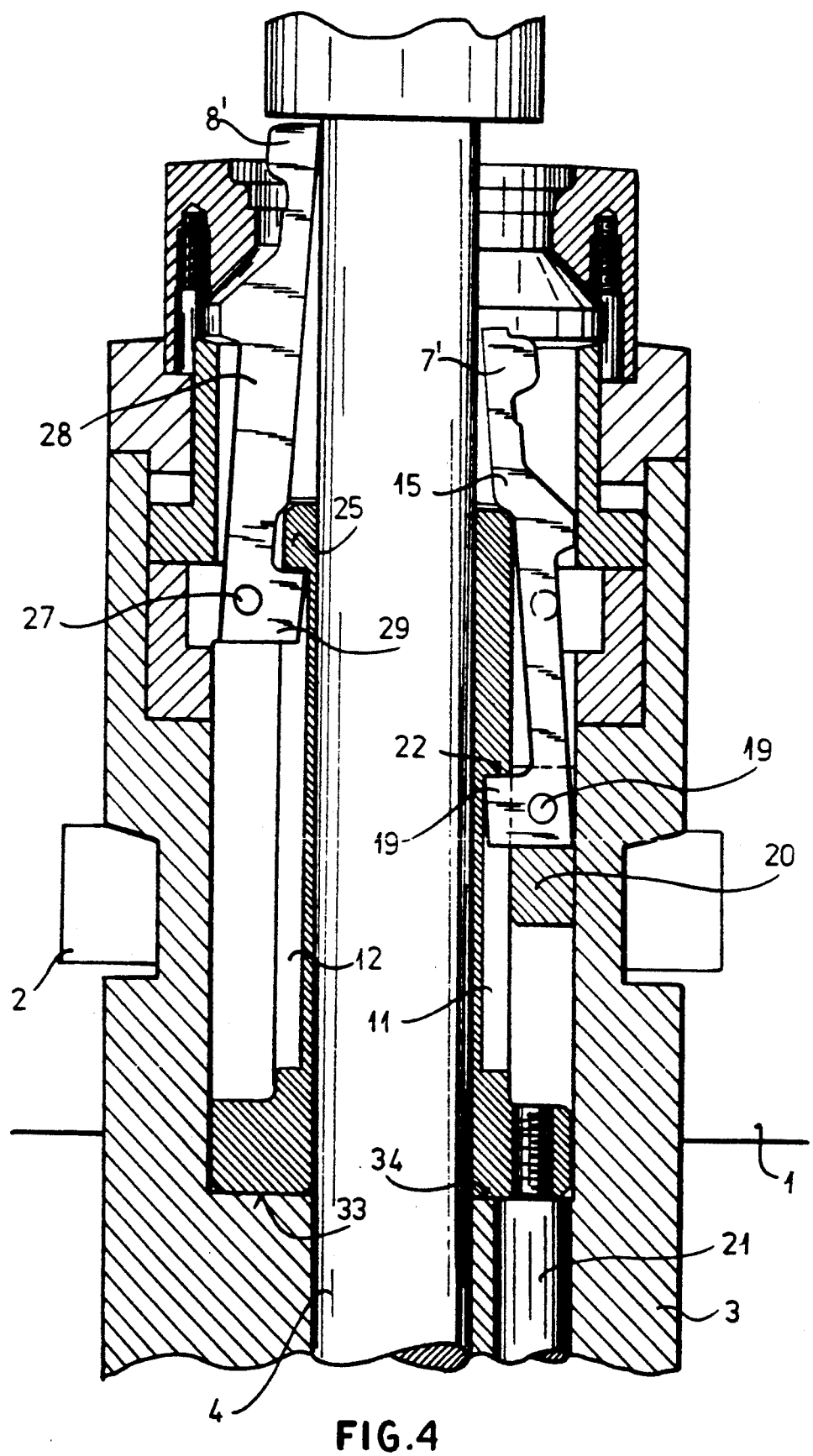
FIG. 4 is a view of the die showing the actuating sleeves withdrawn and the levers and bead segments in their retracted positions.

The assembly shown in FIG. 1 and, of course, FIGS. 3 and 4, is the core assembly of injection molding die, the separable or divided outer die member of which is represented at 1 in FIG. 1 and is partly shown at 1a in FIG. 3 where it delimits a mold cavity in which a pipe fitting 5 is injection molded. A ring 2 is engageable in a recess 3a of a core sleeve to retain the core relative to the outer die member as is conventional in the art and the core sleeve 3 can surround a cylindrical shaft 4 forming a core carrier.

The pipe fitting 5, which is injection molded in the die, has an annular groove 6 which is internally open and is defined by the configuration of an annular bead projecting from the die core and composed of two groups of segments 7, 8 which can be radially retracted into the interior of the core and thus below the outer surface thereof.

The right half of FIG. 1 shows a retracted position of one of the segments of the first group which is both axially shiftable and inwardly displaceable and retracted positions of both groups of segments can be seen from FIG. 4. Alternative positions are also shown in this portion of the drawing. Conversely, the working or bead-forming position is shown in the left half of FIG. 1 and in FIG. 3.

More specifically, the right half of FIG. 1 shows a segment 7' of the first segment group 7 in dot-dash line form in its working or bead forming position and this segment designated 7" with solid lines in its inwardly retracted and axially shifted position. The left half of FIG. 1 shows a segment 8' of the second segment group 8 with solid lines in its working position and this segment 8" in dot-dash lines in its retracted position.

The radial retraction of the segments of the first segment group 7 and the associated axial withdrawal thereof and the radial retraction of the segments of the second segment 8 into the interior of the core is effected with an actuating sleeve 9.

The actuating sleeve 9 has an annular end region 10 and, in the radial planes of the segments of the segment groups 7 and 8, respective axial grooves 11 and 12 which alternate with one another around the periphery of the actuating sleeve 9. The grooves 11 which are associated with the first segment group (right half of FIGS. 1, 3 and 4) are comparatively short while the grooves 12 of the second segment groove (left half of FIGS. 1, 3 and 4) are comparatively long to ensure an axial offset in the abutment surfaces 22 and 30 formed at the corresponding ends of the grooves 11 and 12 proximal to the segments.

In each group 11, a respective radial arm of the bell-crank lever 13 of each of the segments of the first group engages, the axially extending lever arm 15 thereof carrying one of the first segments 7', 7". In the working position with the outwardly displaced bead, the segments 7 and 8 alternate with one another and are located in a circumferential row, this position being represented in FIG. 3 as well as in the right hand half of FIG. 1 in dot-dash lines and FIG. 2. In this position, the actuating sleeve 9 assumes the dot-dash position shown at 10' at the right hand side of FIG. 1 inwardly of the segment 7' and braces the axial lever arm 15' from behind the latter to block the segments against inward movement (see also FIG. 3).

The fulcrum or pivots 19 of the bell-crank levers 13 of the first group of segments are provided on a ring 20 which is axially shiftable within the sleeve 3 (compare FIGS. 3 and 4). The length of the groove 11 is so dimensioned that, upon retraction of the actuating sleeve 9 by the piston rod 21 of the pneumatic or hydraulic actuator, the circular ring region 10 bracing the axial lever arms 15' against inward movement, is retracted to unlock the lever arms 15' for inward swinging, whereupon the abutment end face 22 of groove 11 engages the respective radial arm 14 to swing the respective lever 13 about its fulcrum 19 and draw the respective segment 7' inwardly. Further downward movement of the sleeve 9 draws the lever 13 axially along with it until the lever assumes the solid line position shown at FIG. 1 at the right hand side and the position shown in FIG. 4.

This radial inward movement and axial retraction of the segments 7' of the first segment group 7 permits the segments 8' of the second segment group 8 to be swung inwardly.

This can be seen from the left half of FIG. 1 and a comparison of FIGS. 3 and 4. The grooves 12 in the actuating sleeve 9 have greater lengths than the grooves 11. At the end of the sleeve 9 inwardly of the segments 8', therefore, there is a narrower annular region 25 to brace and lock the bell-crank levers 26 associated with the second group 8 of the segments 8'.

The bell-crank levers 26 have their fulcrums or pivots 27 fixed to the core sleeve 3. The bell-crank levers 26 each also have an axial lever arm 28 carrying a respective segment 8' of the second segment group 8 at the free end thereof, and a radial lever arm 29 projecting into the respective groove 12.

In the working position, the bell-crank lever 26 of the left hand side in FIG. 1 is shown in solid lines (see FIG. 3) in which its segment 8' forms part of the annular bead defining the groove 6 in the injection molding article. The lever 26 is actuated by abutment surfaces as has been described in connection with levers 13.

For example, upon retraction of the actuating sleeve 9, the levers 26 are first unblocked to swing inwardly by the downward movement of the portion 25 and as the abutment 30 at the end of groove 12 engages the radial arm 29, the lever 26 is swung into its dot-dash position 31 of FIG. 1 and into the position shown in FIG. 4. In this phase, the surface 33 of the sleeve 9 can come to rest against the shoulder 34 of sleeve 3 and can entrain the sleeve 3 with the rod 21 actuated by the hydraulic cylinder to the extent that the outer die 1 has been opened and the ring 2 removed from the groove 3a.

Upon advance of the actuating sleeve 9 by the hydraulic driver, the end face 35 engages an abutment surface 36 of each bell-crank lever 13 and, since the latter cannot be moved outwardly because of the engagement of its guide surfaces 37 in the control surfaces 38 of respective grooves on the interior of the sleeve 3, the assembly of levers 13 and the ring 20 are moved toward the bead forming region. This latter engagement is shown in solid lines at the right hand side of FIG. 1. At the same time the region 25 bears against an inner notch flank of the levers 26 as represented in dot-dash lines on the left hand side of FIG. 1 to cam these levers outwardly about the fixed fulcrums 27. Once the segments 8' are in position and the segments 7' have been shifted into the same transverse plane as the segments 8', the termination of the guide surface 38 at the notch 18 permits the lever arms 15 to be swung outwardly by the camming action of the end face 35, thereby restoring the segments to their working position. The portions 10 and 25 inwardly of the axial arms of the levers brace the segments against inward movement even under the injection molding force.

Figure 2:
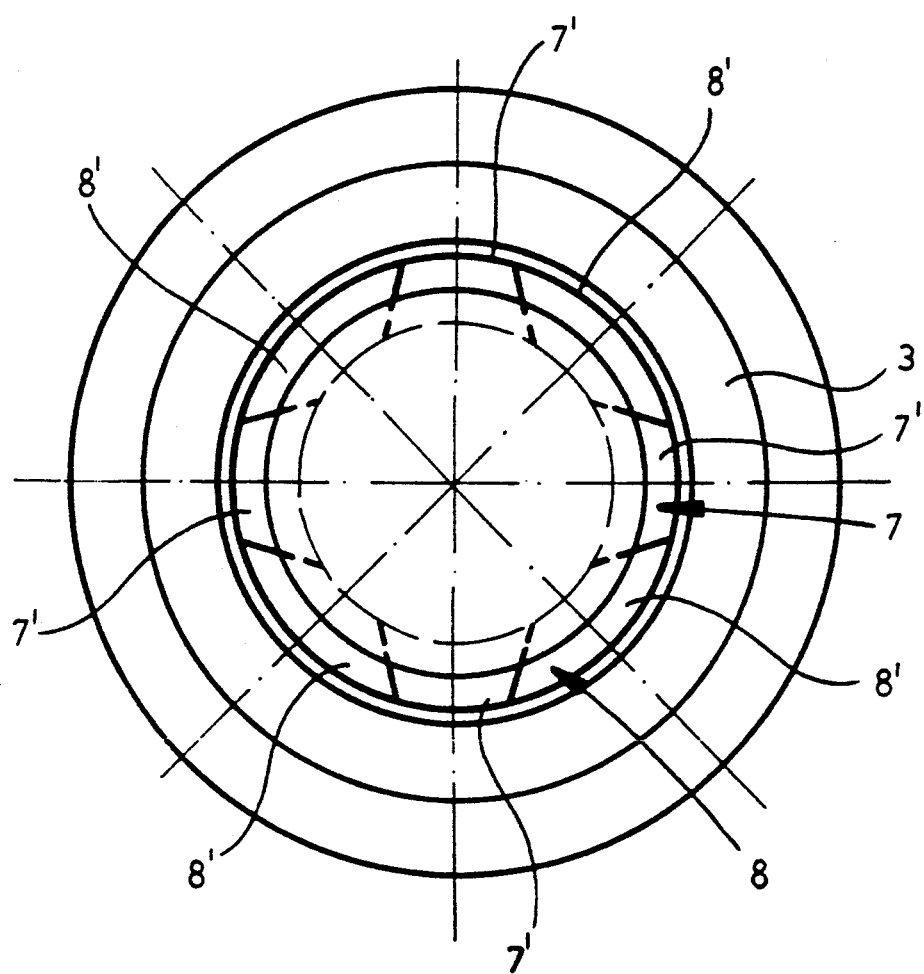
FIG. 2 is an end view of the die core showing the two segment groups forming an annular bead constituting part of the core.

FIG. 2 represents a front view of the core of FIG. 1 and the segments 7' and 8' of the group 7 and 8 can be delineated. The wedge shapes of the segments 7' and 8' is visible and it will thus be understood that the segment 7' can then be first inwardly withdrawn and then axially retracted before the segments 8' are liberated for inward movement. In the embodiment shown each segment group has four segments.

I claim:

1. An injection-molding tool for producing an injection-molded pipe fitting with an internal groove, said injection-molding tool comprising:

a die core having a plurality of levers, each of said levers being pivotally movable inwardly and outwardly, each lever having a bead segment, said bead segments together forming an annular bead when said levers are in said outer position for defining an internal groove of an injection-molded pipe fitting, said pipe fitting being released from said levers when said levers are moved inwardly, said levers each having an axially extending elongated lever arm carrying the respective bead segment on an end thereof, a generally radial arm and a fulcrum between said arms, a cylindrical shaft formed as a core carrier, said segments and said levers being arrayed around said shaft;

a core sleeve surrounding said shaft;

a ring received in said core sleeve and axially shiftable therein, said fulcrums of said levers of a first group of bead segments being mounted on said ring for axial displacement therewith, the fulcrums of said levers of a second group of the bead segments between the bead segments of the first group being fixed on said core sleeve;

an actuating sleeve axially shiftable on said shaft and within said core sleeve, said actuating sleeve being formed with axially extending outwardly open slots receiving said radial arms of said levers and having abutments at ends of said slots engageable with said radial arms for actuating said levers, said abutments including a first group of abutments engageable with the radial arms of the levers of the first group of bead segments effective to retract said first group of bead segments inwardly and move said first group of bead segments and said ring axially upon axial displacement of said actuating sleeve and a second group of abutments engageable with the radial arms of the levers of said second group of bead segments for retracting the second group of bead segments inwardly upon further axial displacement of said actuating sleeve, said first group of abutments being axially spaced from said second group of abutments on said actuating sleeve; and fluid operated means connected with said actuating sleeve for axially shifting said actuating sleeve.

2. The injection-molding tool defined in claim 1 wherein said actuating sleeve has an annular region between the bead segments and said cylindrical shaft.

3. The injection-molding tool defined in claim 2 wherein said axially extending elongated lever arms are formed with guide surfaces for positioning said bead segments in a radial inward direction and wedging surfaces for positioning said bead segments in an axial outward direction.

4. The injection-molding tool defined in claim 1 wherein said levers are provided with inclined surfaces cooperating with inclined surfaces of said core sleeve for positively guiding said levers of said first group of bead segments as they move along said core sleeve.

5. The injection-molding tool defined in claim 1 wherein said core sleeve has guide surfaces positively guiding said levers of said first group of bead segments between outer and retracted positions upon axial displacement of said actuating sleeve.

6. The injection-molding tool defined in claim 1 wherein each of said axially extending elongated lever arms of the levers of said first group of bead segments is formed with an engagement surface cammingly engaged by an end face of said actuating sleeve for displacing the respective lever arm outwardly.

7. The injection-molding tool defined in claim 1 wherein said actuating sleeve has an inner end face extending radially outwardly from said cylindrical shaft, said core sleeve being formed with an annular shoulder engaging said inner face of said core sleeve in a retracted position of said bead segments and with an outer groove recessed in said core sleeve, said injection-molding tool further including another ring mounted in said groove and being removable therefrom upon opening of a die containing said injection molding tool.

* * * * *